(12) United States Patent
Kawanishi

(10) Patent No.: US 9,147,135 B2
(45) Date of Patent: Sep. 29, 2015

(54) IMAGE FORMING DEVICE, IMAGE FORMING METHOD AND PROGRAM

(71) Applicant: CANON KABUSHIKI KAISHA, Tokyo (JP)

(72) Inventor: Masaki Kawanishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/757,374

(22) Filed: Feb. 1, 2013

(65) Prior Publication Data

US 2013/0208297 A1 Aug. 15, 2013

(30) Foreign Application Priority Data

Feb. 9, 2012 (JP) ................. 2012-026466

(51) Int. Cl.
*G06K 15/02* (2006.01)
*G06K 15/00* (2006.01)

(52) U.S. Cl.
CPC ............ *G06K 15/02* (2013.01); *G06K 15/1817* (2013.01); *G06K 15/4095* (2013.01); *G06K 15/4055* (2013.01)

(58) Field of Classification Search
CPC .............. G06K 15/02; G06K 15/1817; G06K 15/4055; G06K 15/4095
USPC .................. 358/1.1–1.9, 1.11–1.18
See application file for complete search history.

(56) References Cited

U.S. PATENT DOCUMENTS

| | | | |
|---|---|---|---|
| 5,287,434 A * | 2/1994 | Bain et al. | 235/462.15 |
| 6,965,449 B2 * | 11/2005 | Sugiyama | 358/1.15 |
| 6,976,084 B2 * | 12/2005 | Pineau et al. | 709/232 |
| 2012/0140259 A1 * | 6/2012 | Ozawa et al. | 358/1.13 |

FOREIGN PATENT DOCUMENTS

| | | | |
|---|---|---|---|
| JP | 1996-166862 | * | 1/1996 |
| JP | 1996-166862 | * | 5/1996 |
| JP | 9-101869 | | 4/1997 |
| JP | 3344186 | | 8/2002 |
| JP | 2008-234111 | * | 1/2008 |
| JP | 2008-234111 | * | 10/2008 |

* cited by examiner

Primary Examiner — King Poon
Assistant Examiner — Ibrahim Siddo
(74) Attorney, Agent, or Firm — Fitzpatrick, Cella, Harper & Scinto

(57) ABSTRACT

In the case where all print jobs are stored in a nonvolatile storage area such as a hard disc to protect the print job at power-off, normal printing time becomes long. In the case where a power-off request is received, the print job that is executing print processing is stored in the nonvolatile storage area. At this time, the print job and authentication information capable of identifying a print-instructing person are associated with each other and stored.

3 Claims, 9 Drawing Sheets

| 500 | 502 | 504 | 506 | 508 | |
|---|---|---|---|---|---|
| JOB ID | USER ID | PASSWORD | JOB TYPE | STATUS | |
| 0001 | userA | passa | PDL | BMP | 510 |
| 0002 | userA | passa | PDL | DL | 512 |
| 0003 | userB | passb | COPY | BMP | 514 |
| 0004 | userC | passc | PDL | PDL | 516 |
| 0005 | userD | passd | PDL | PDL | 518 |

FIG.5

IMAGE FORMING DEVICE, IMAGE FORMING METHOD AND PROGRAM

BACKGROUND OF THE INVENTION

1. Field of the Invention

The present invention relates to an image forming device, an image forming method and program that protect a print job at power-off.

2. Description of the Related Art

In recent years, under the situation of power saving and power supply shortage, power consumption amount of information equipment and power supply amount to the information equipment have become controllable by a power management server. In some cases, the power management server transmits a power-off request to the information equipment, and cuts off power of the information equipment. At this time, while the information equipment is executing some processing, there may occur a problem that the processing cannot be continued. For example, in the case of receiving the power-off request during print processing, a copying machine stops the print processing and cuts off power, resulting in that a printed matter cannot be obtained. At this time, by controlling so as to cut off power after completion of the print processing, it is possible to obtain the printed matter. However, there occurs a problem that power-off cannot be immediately executed.

To solve such problem, an art on a printer server that stores print data requested by a print-requesting device is known (for example, Japanese Patent Publication No. 3344186). According to Japanese Patent Publication No. 3344186, authentication information of the print-requesting device and the print data requested by the print-requesting device are saved in a hard disc as nonvolatile storage means of the printer server. Thus, in the case where power is turned on again after cut-off of the power for the printer server, the print processing can be automatically restarted.

However, according to the above-mentioned prior art, since the print data requested by the print-requesting device is stored in the hard disc of the printer server at all times, as compared to the case where the print data is printed without being stored in hard disc, printing takes a longer time. This is due to additional time required to write the received print data from a volatile memory such as a memory into the hard disc, and time required to read the print data from the hard disc for printing.

SUMMARY OF THE INVENTION

An image forming device according to the present invention includes: a first determining unit configured to determine, after receiving a power-off request, whether or not print processing is being executed; a second determining unit configured to determine, in the case where it is determined that print processing is being executed, whether or not authentication information of a print-instructing person of the print processing being executed is identifiable; and a cut-off unit configured to associate a print job of the print processing being executed with the authentication information and store the print job and the authentication information in a nonvolatile storage area in the case where the authentication information is identifiable, and then cut-off power.

According to the present invention, it is possible to provide an image forming device, an image forming method and program that protect print data, in the case of having received the power-off request during execution of the print processing, so as to make it possible to resume the print processing without increasing execution time of the print processing.

Further features of the present invention will become apparent from the following description of exemplary embodiments (with reference to the attached drawings).

BRIEF DESCRIPTION OF THE DRAWINGS

FIG. 5 is a table showing processing at printing;
FIG. 9 is a flow chart showing processing at power-on.

DESCRIPTION OF THE EMBODIMENTS

Preferred embodiments for implementing the present invention will be described below with reference to figures. However, components described in the embodiments are merely examples, and do not intend to limit the scope of the invention to these embodiments.

Figure 1:
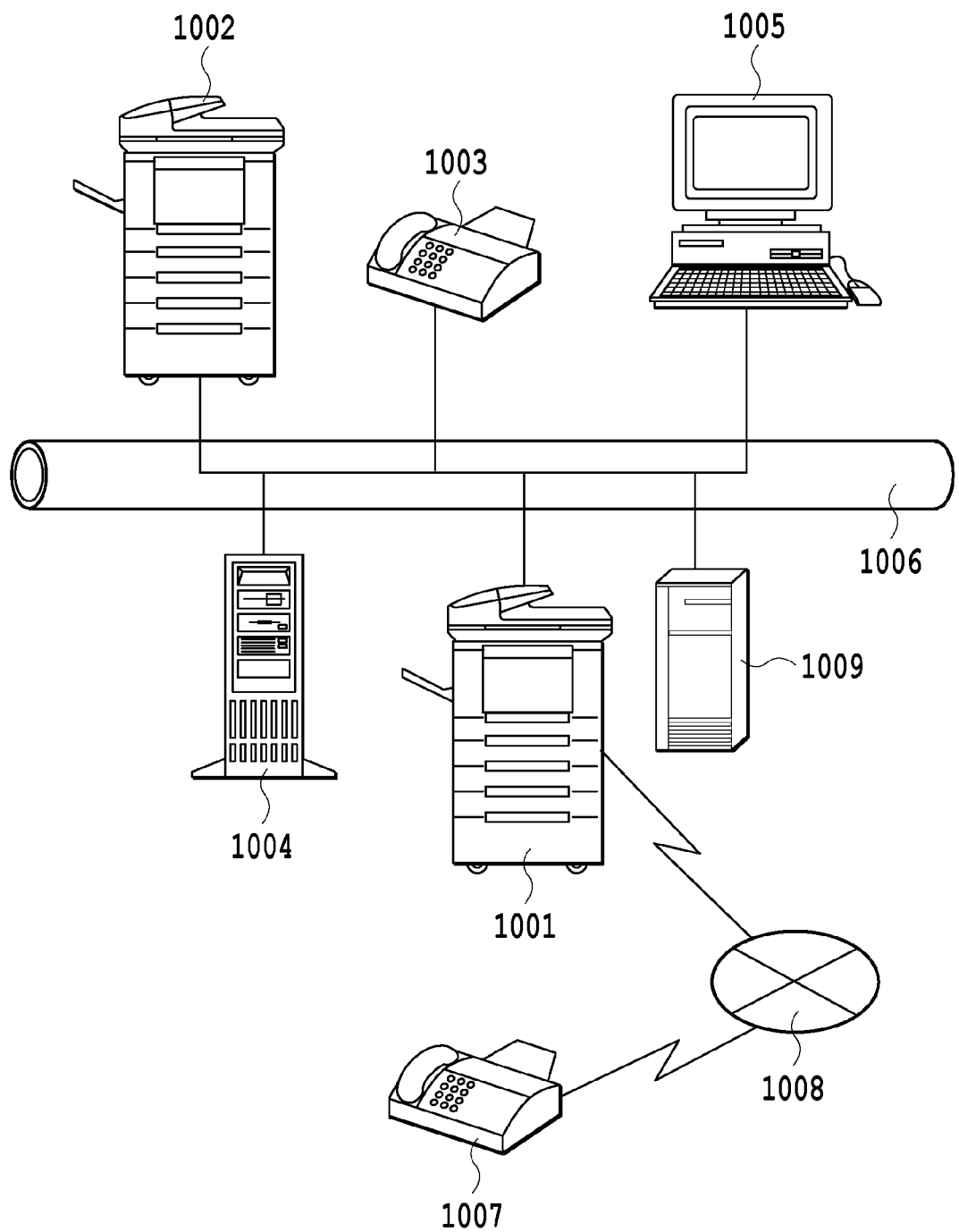
FIG. 1 is a view showing a network configuration.

FIG. 1 is a view schematically showing a network configuration that accommodates an image forming device in accordance with one embodiment of the present invention. This embodiment describes a copying machine having a data transmission function as an image forming device.

As shown in FIG. 1, a copying machine 1001, a copying machine 1002, a facsimile machine 1003, a database/mail server 1004, a client computer 1005, and a power management server 1009 are accommodated in a LAN 1006 including Ethernet (registered trademark) and the like. The copying machine 1001 and the copying machine 1002 have the same function.

The copying machine 1001 along with a facsimile 1007 are accommodated in a public line 1008. The copying machine 1001 has a copying function and a facsimile function as well as a data transmission function of reading a document image and transmitting the read image data to each device on the LAN 1006. The copying machine 1001 has a PDL function, and can receive and print a PDL print job instructed from the client computer 1005 connected to the LAN 1006. The copying machine 1001 can store, in a designated box area of a hard disc 2004, an image read by the copying machine 1001 and an image obtained by processing the PDL print job received from the client computer 1005 connected to the LAN 1006. The copying machine 1001 can print the image stored in the box area.

The copying machine 1001 can receive, via the LAN 1006, data read by the copying machine 1002, and store the received data in the hard disc 2004 of the copying machine 1001 or print-output the received data. The copying machine 1001 can further receive an image in the database/mail server 1004 via the client computer 1005 and the LAN 1006, store the received image in the copying machine 1001, and print-output the image.

The facsimile machine 1003 can receive data read by the copying machine 1001, and transmit the received data, via the LAN 1006.

The database/mail server 1004 is a server device having functions of receiving data read by the copying machine 1001 via the LAN 1006, storing the data in a database, and transmitting the data as an e-mail.

The client computer 1005 is connected to the database/mail server 1004, and can acquire desired data from the database/ mail server 1004 and display the data. The client computer 1005 can receive data read by the copying machine 1001 via the LAN 1006, and process and edit the received data.

The facsimile 1007 can receive data read by the copying machine 1001 via the public line 1008, and print-output the received data.

The power management server 1009 controls power consumption amount and power supply amount for each device such as the copying machine 1001 connected to the LAN 1006. The power management server 1009 can also transmit a power-off request to each device such as the copying machine 1001 to cut-off power of the device.

Figure 2:
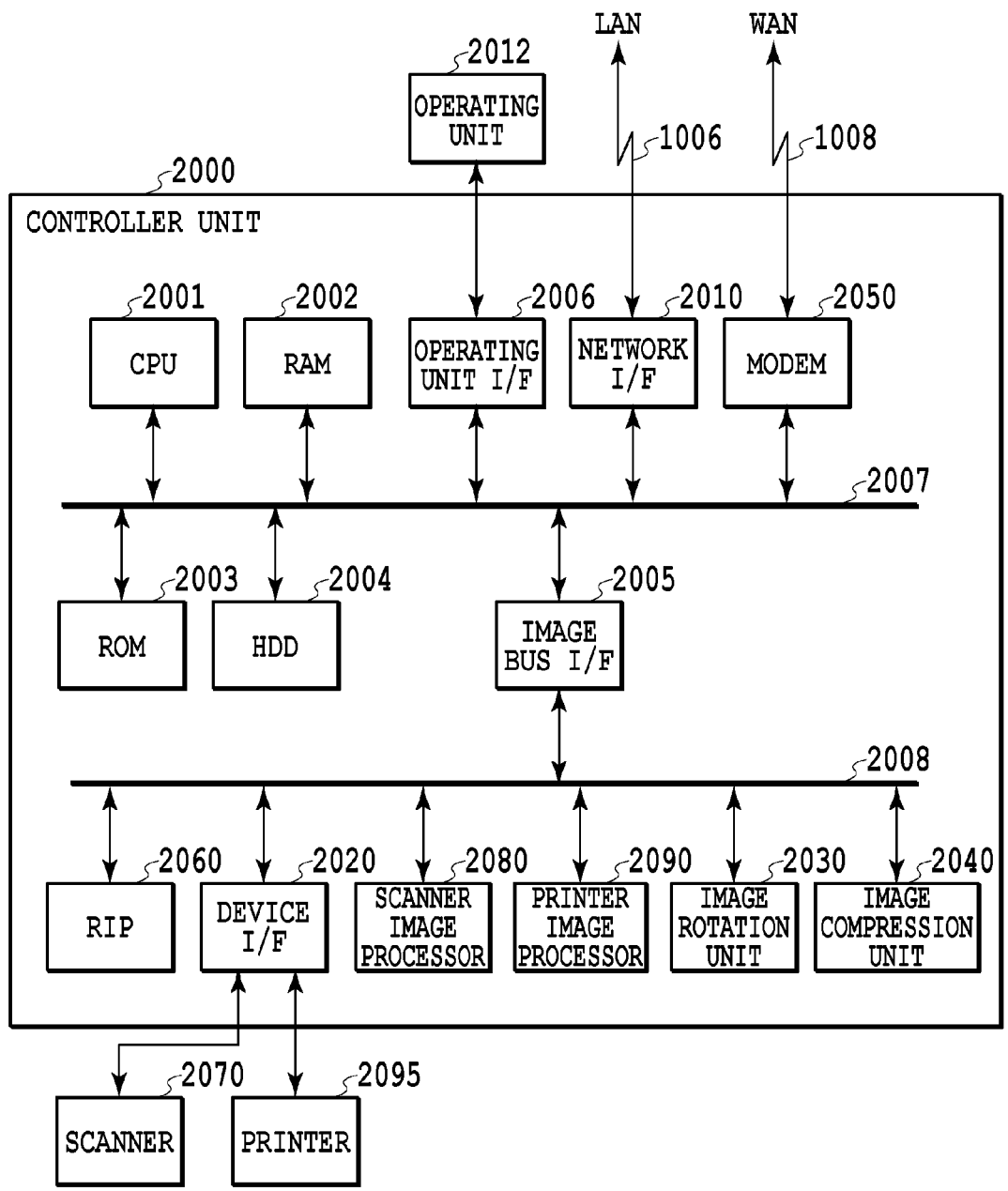
FIG. 2 is a block diagram showing a main configuration of a copying machine.

FIG. 2 is a block diagram showing a configuration of a main part of the copying machine 1001 in FIG. 1. A controller unit 2000 is connected to a scanner 2070 as an image input device and a printer 2095 as an image output device. The controller unit 2000 performs control to achieve a copying function of print-outputting image data read with the scanner 2070 by the printer 2095. The controller unit 2000 is connected to the LAN 1006 and the public line 1008 (WAN) to perform control to input/output image information and device information.

The controller unit 2000 has a CPU 2001 and an HDD (hard disc drive) 2004. The CPU 2001 boots an operating system (OS) according to a boot program stored in a ROM 2003, and executes an application program stored in the HDD 2004 on the OS, thereby performing various processing.

A RAM 2002 is used as a working area of the CPU 2001. The RAM 2002 is the working area as well as a volatile storage area that provides an image memory area for temporarily storing image data. The HDD 2004 is a nonvolatile storage area that stores image data together with the application program.

The CPU 2001 is connected to the ROM 2003, the RAM 2002, an operating unit I/F (interface) 2006, a network IF 2010, a modem 2050 and an image bus I/F 2005 via a system bus 2007. The operating unit I/F 2006 is an interface with an operating unit 2012 having a touch panel and a hard key, and outputs image data to be displayed on the operating unit 2012 to the operating unit 2012. The operating unit I/F 2006 transmits information input to the operating unit 2012 by the user to the CPU 2001.

The network I/F 2010 is connected to the LAN 1006, and inputs/outputs information from/to each device on the LAN 1006 via the LAN 1006.

The modem 2050 is connected to the public line 1008, and inputs/outputs information via the public line 1008.

The image bus I/F 2005 is a bus bridge that connects the system bus 2007 to an image bus 2008 for transferring image data at high speed, and converts a data structure.

The image bus 2008 is constituted by a PCI bus or IEEE 1394. On the image bus 2008, there are provided a raster image processor (hereinafter referred to as RIP) 2060, a device I/F 2020, a scanner image processor 2080, a printer image processor 2090, an image rotation unit 2030, and an image compression unit 2040.

The RIP 2060 is a processor that expands intermediate language data to a bitmap image. The device I/F 2020 is connected to the scanner 2070 and the printer 2095, and the device I/F 2020 converts image data between a synchronous system and an asynchronous system.

The scanner image processor 2080 corrects, processes and edits input image data. The printer image processor 2090 applies image correction, halftone processing and the like to print-output image data.

The image rotation unit 2030 rotates image data. The image compression unit 2040 compresses multivalued image data to JPEG data, and binary image data to JBIG, MMR, MH data or the like, and performs expanding processing.

First Example

An example of the present invention implemented by the copying machine 1001 having the above-mentioned configuration as an image forming device will be described.

Figure 3:
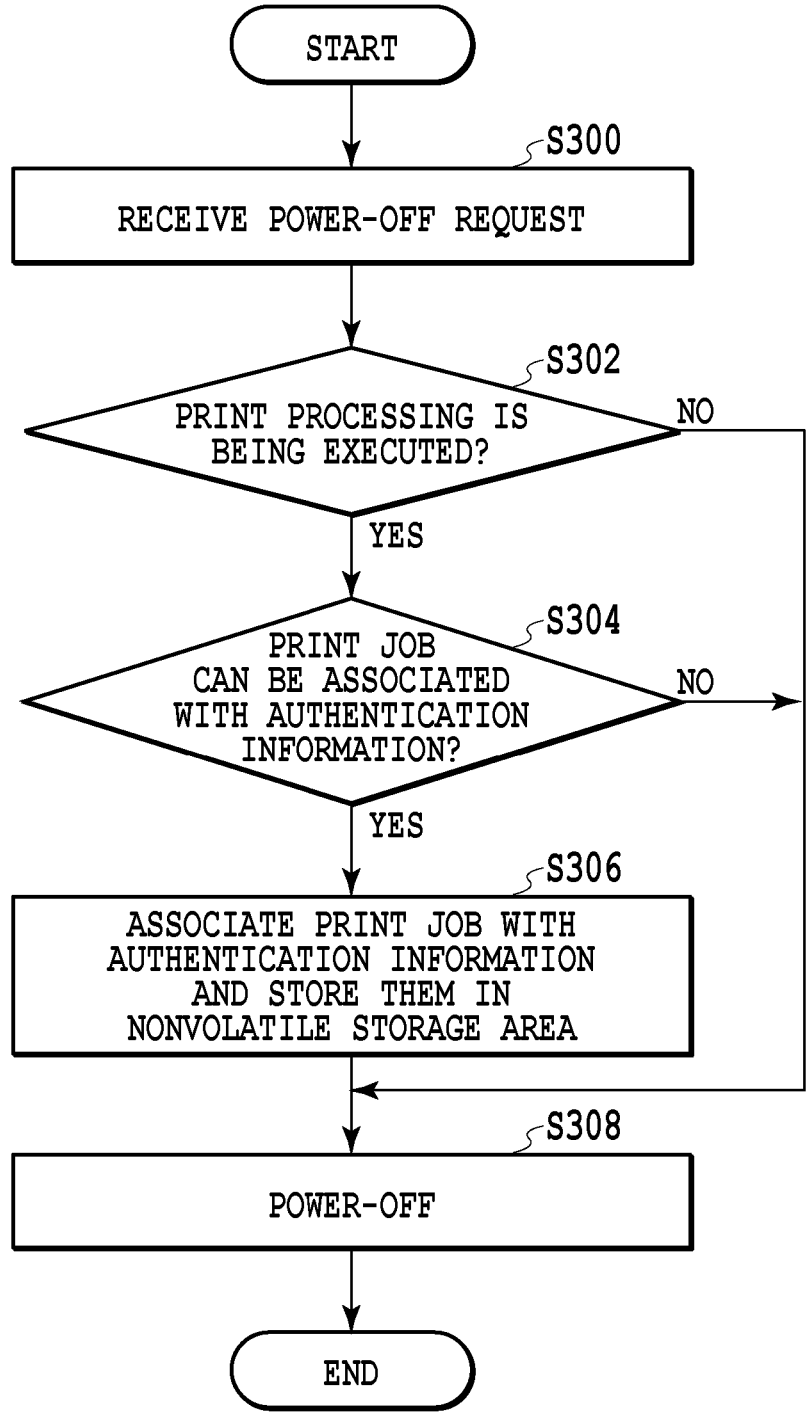
FIG. 3 is a flow chart showing processing at power-off.

FIG. 3 is a flow chart at power-off. The flow chart in FIG. 3 is executed by the CPU 2001 in FIG. 2 according to the program stored in the HDD 2004 in FIG. 2.

In S300, the copying machine 1001 receives the power-off request from the power management server 1009, and processing proceeds to S302.

In S302, the CPU 2001 determines whether or not print processing of a print job stored in the RAM 2002 is being executed (first determination).

Figure 4:
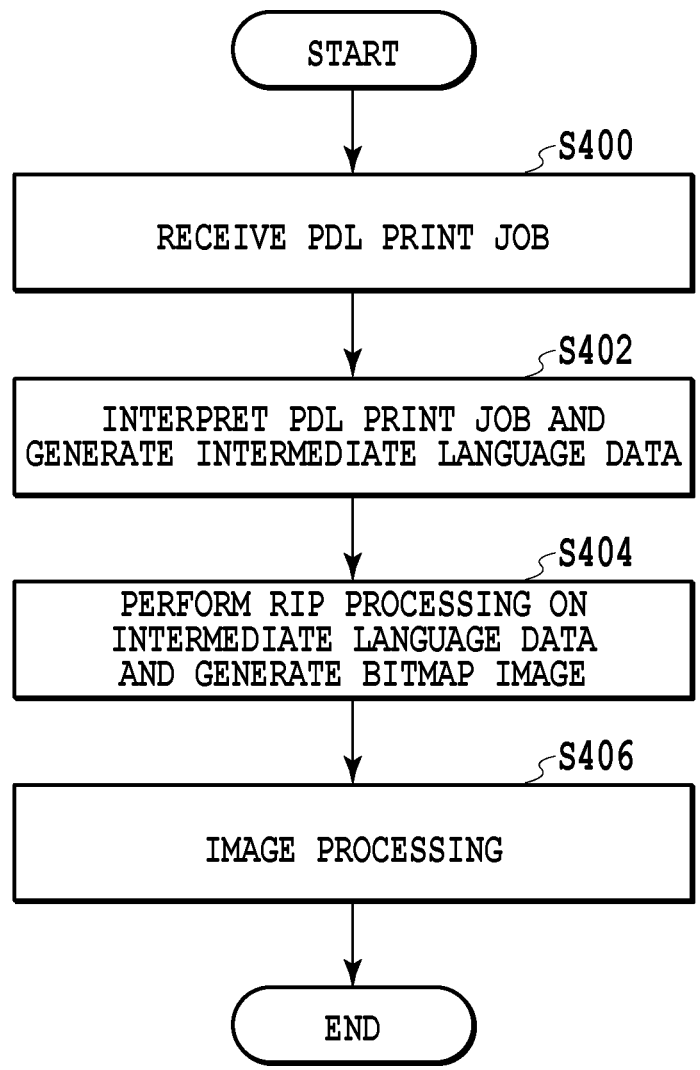
FIG. 4 is a flow chart showing processing of PDL printing.

Here, a processing flow of a PDL (Page Description Language) print job as an example of the print processing is described using a flow chart in FIG. 4.

In S400, the controller unit 2000 receives the PDL print job from the client computer 1005 via the LAN 1006. The received PDL print job is stored in the RAM 2002, and processing proceeds to S402.

In S402, the CPU 2001 interprets the stored PDL print job to generate intermediate language data. The generated intermediate language data is stored in the RAM 2002, and processing proceeds to S404.

In S404, the CPU 2001 transmits the stored intermediate language data to the RIP 2060, and generates a bitmap image. The generated bitmap image is compressed by the image compression unit 2040 and then, is stored in the HDD 2004, and processing proceeds to S406.

In S406, the CPU 2001 transmits the stored compressed image to the image compression unit 2040, and expands the compressed image. The expanded image is transmitted to the printer image processor 2090 and processed there. An image-processed image signal is transmitted to the printer 2095 and is output.

The determination on whether or not the print processing is being executed in S302 in FIG. 3 is YES in the case where any of steps in the flow chart in FIG. 4 is being executed, and processing proceeds to S304. In the case where any of steps in the flow chart in FIG. 4 is not being executed, the determination is NO and processing proceeds to S308. That is, "print processing is being executed" includes any of a state of holding the PDL print job at PDL printing, a state of holding the intermediate language data obtained by interpreting the PDL print job, and a state of holding bitmap data obtained by performing RIP processing on the intermediate language data. Although it is determined whether or not the print processing is being executed by using the PDL print job as an example in this example, the present invention is not limited to this. The determination on whether or not the print processing is being executed is made with respect to all functions of the copying machine 1001, such as copy and facsimile.

In S304, the CPU 2001 determines whether or not the print job of the print processing being executed can be associated with the authentication information. In the case where it is determined that the print job can be associated with the authentication information, processing proceeds to S306, and in the other case, processing proceeds to S308.

The authentication information is, for example, a user ID and a password of a print-instructing person, and is information capable of identifying the print-instructing person. The authentication information only needs to identify the print-instructing person, and is not limited to the user ID and the password. For example, in the case of the above-mentioned PDL print job, in the case where the PDL print job includes the user ID and the password, the determination in S304 is YES. In the case where the copy function is used, in the case where the user of the copying machine 1001 inputs the user ID and the password for user authentication before using the copying machine, the determination in S304 is YES. Note that the user authentication is made by an authentication system not shown according to any publicly known method, and the authentication method is not specifically limited.

That is, in S304, it is determined whether or not the authentication information of the print-instructing person of the print processing being executed is identifiable based on information included in the PDL print job, user input or the like (second determination). In the case where it is identifiable, processing proceeds to S306, and in the other case, processing proceeds to S308. In the case where it is determined that the authentication information is not identifiable, processing may proceed to S308 after deletion of the print job.

In S306, the CPU 2001 associates the print job with the authentication information, and stores them in the nonvolatile storage area (for example, HDD 2004). That is, the copying machine 1001 receives the power-off request, and only in the case where the print job can be associated with the authentication information, the copying machine 1001 stores the print job associated with the authentication information in the nonvolatile storage area. By storing the print job and the authentication information in association with each other, as described in Fourth Example, in the case where power is turned on again, the print-instructing person can print the stored print job.

FIG. 5 shows an example of information on the print job stored in the HDD 2004. Reference numeral 500 denotes a job ID. The job ID is assigned to the print job to be stored, and is stored. Reference numeral 502 denotes the user ID. The user ID is a part of the authentication information that can identify the print-instructing person, and is the user ID of the print-instructing person. Reference numeral 504 denotes the password. The password is a part of the authentication information that can identify the print-instructing person, and is the password of the print-instructing person. Reference numeral 506 denotes a job type. The job type is information for identifying which function is being executed by the print job to be stored. Reference numeral 508 denotes a status. The status is information for identifying a state of the print job at the time when the print job is stored.

Reference numeral 510 denotes stored information on the print job having the job ID 500 of "0001". Reference numeral 512 denotes stored information on the print job having the job ID 500 of "0002". Reference numeral 514 denotes stored information on the print job having the job ID 500 of "0003". Reference numeral 516 denotes stored information on the print job having the job ID 500 of "0004". Reference numeral 518 denotes stored information on the print job having the job ID 500 of "0005".

FIG. 5 shows the example in which PDL indicating the PDL function and COPY indicating the copy function are shown as the job type 506. However, in the case where other functions such as facsimile are used, information on FAX etc. is stored. PDL indicating the state of storing the PDL print job in the RAM 2002, DL indicating the state of storing the intermediate language data in the RAM 2002, and BMP indicating the state of storing the compressed bitmap image in the HDD 2004 are shown as examples of the status 508. However, in the case where other states exist, information indicating the states is stored. In S308, the CPU 2001 cuts off power of the copying machine 1001.

As described above, according to the present example, the copying machine 1001 receives the power-off request, stores the print job in the nonvolatile storage area only in the case where the print job can be associated with the authentication information, and stores the print job in the volatile storage area in the normal print processing. For this reason, in the normal print processing, a delay of processing caused by storage of the print job in the nonvolatile storage area does not occur.

In the case where the power-off request is received, the print job is stored in the nonvolatile storage area without waiting for completion of the print processing and then, power is turned off. For this reason, as comparison to the case where the print processing is completed and then, power-off is performed, power-off can be achieved more quickly.

Second Example

Another example of the present invention implemented by the copying machine 1001 having the above-mentioned configuration as an image forming device will be described.

Figure 6:
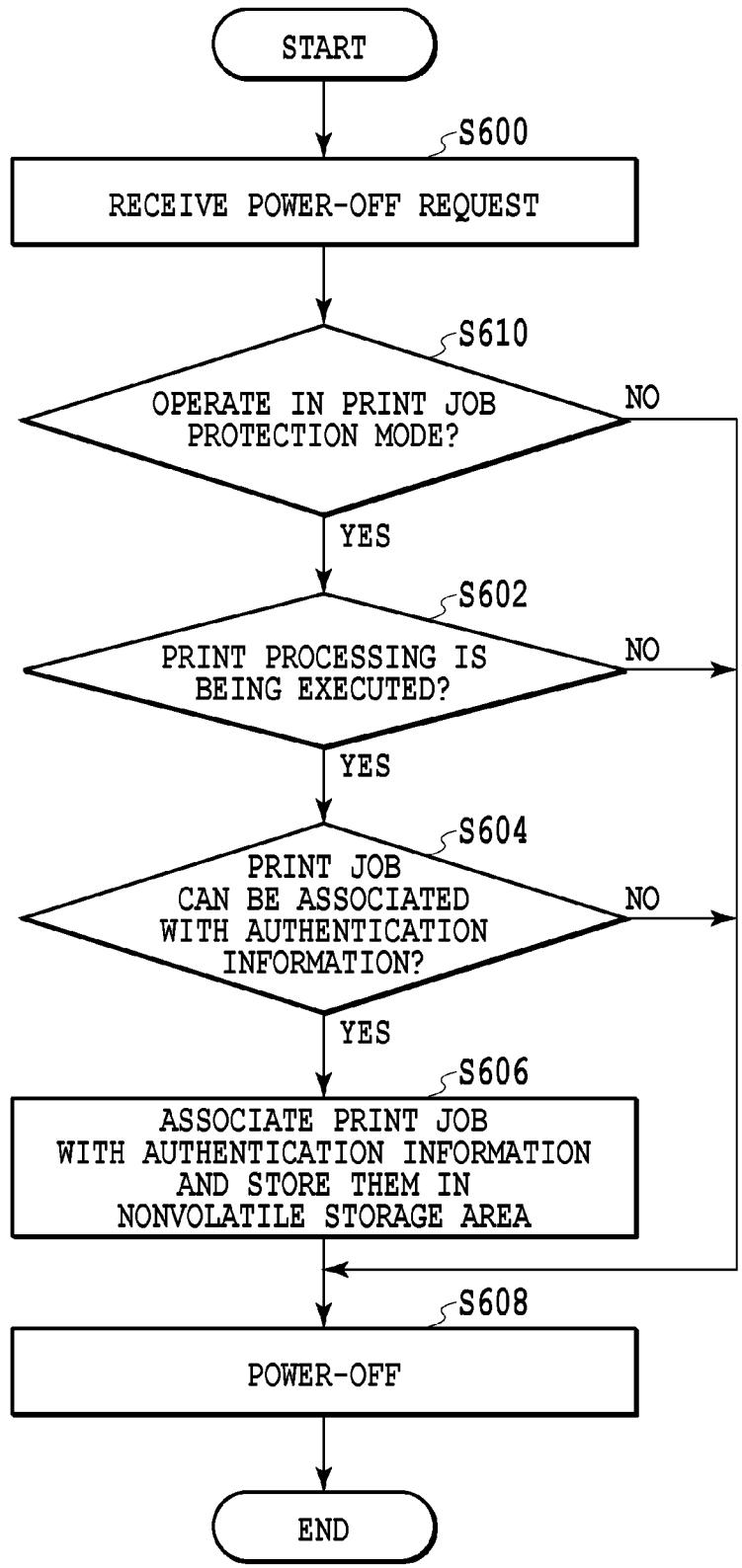
FIG. 6 is a flow chart showing processing at power-off.

FIG. 6 is a flow chart at power-off. The flow chart in FIG. 6 is executed by the CPU 2001 in FIG. 2 according to the program stored in the HDD 2004 in FIG. 2. Note that description herein is substantially similar to that in the above-mentioned example in FIG. 3 and thus, only differences will be described below.

In S610, the CPU 2001 determines whether or not the copying machine 1001 is set to a print job protection mode. The print job protection mode can be turned ON/OFF in the case where an input screen is displayed on the operating unit 2012 and the user operates the operating unit 2012. Alternatively, the print job protection mode may be fixedly set in a system. In the case where the print job protection mode is set, processing proceeds to S602, and in the other case, processing proceeds to S608.

As a result, in the case where the user does not intend to protect the print job, the operation can be switched by change of setting.

Third Example

Still another example of the present invention implemented by the copying machine 1001 having the above-mentioned configuration as an image forming device will be described.

Figure 7:
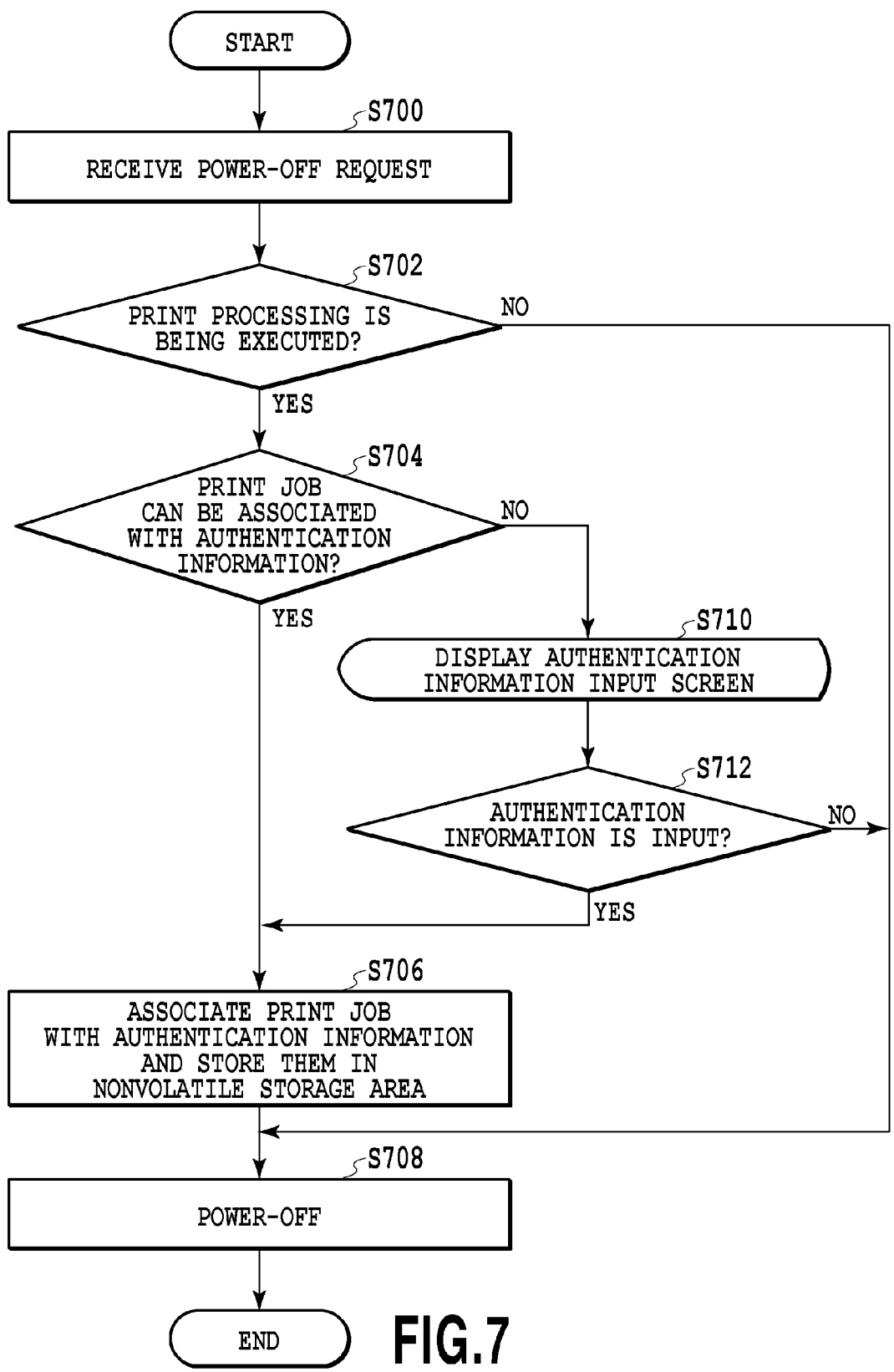
FIG. 7 is a flow chart showing processing at power-off.

FIG. 7 is a flow chart at power-off. The flow chart in FIG. 7 is executed by the CPU 2001 in FIG. 2 according to the program stored in the HDD 2004 in FIG. 2. Note that description herein is substantially similar to that in the above-mentioned example in FIG. 3 and thus, only differences will be described below.

In S710, the CPU 2001 displays an authentication information input screen not shown on the operating unit 2012 via the operating unit I/F 2006.

In S712, the CPU 2001 determines whether or not the user correctly inputs the authentication information to the authentication information input screen via the operating unit 2012. Specifically, first, in the case of receiving an input of the authentication information from the authentication information input screen, the operating unit 2012 informs it to the CPU 2001 via the operating unit I/F 1006. The CPU 2001 determines whether or not the authentication information is correctly input. In the case where the authentication information is correctly input, processing proceeds to S706, and in the other case, processing proceeds to S708. In the case where the authentication information is not input for a certain time, processing may proceed to S708. In the case where processing proceeds to S708, the print job of the print processing being executed may be deleted.

In the case where the authentication information is correctly input in S712 and processing proceeds to S706, the print job and the authentication information input in S712 are associated with each other, and are stored in the nonvolatile storage area (for example, HDD 2004).

As a result, even in the case where the user of the copying machine 1001 uses the copy function without performing user authentication before using the copying machine, the print job can be protected by inputting the authentication information later.

Fourth Example

Still another example of the present invention implemented by the copying machine 1001 having the above-mentioned configuration as an image forming device will be described.

Figure 8:
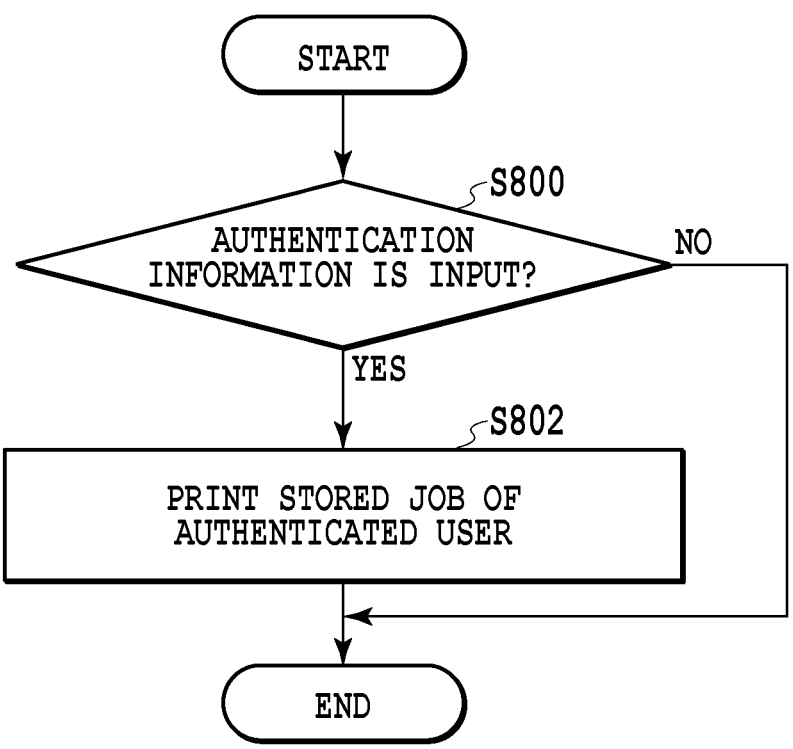
FIG. 8 is a flow chart showing processing at printing.

FIG. 8 is a flow chart at printing. The flow chart in FIG. 8 is executed by the CPU 2001 in FIG. 2 according to the program stored in the HDD 2004 in FIG. 2.

In S800, the CPU 2001 determines whether or not the authentication information is input. Specifically, first, in the case of receiving an input of the authentication information from the authentication information input screen not shown, the operating unit 2012 informs it to the CPU 2001 via the operating unit I/F 2006. The CPU 2001 determines whether or not the authentication information is correctly input. In the case where the authentication information is correctly input, processing proceeds to S802, and in the other case, processing is finished.

In S802, the CPU 2001 transmits the print job, which is associated with the authentication information of the authenticated user and stored, to the printer 2095, and executes the print processing.

Although the authentication information is input from the operating unit 2012 in the present example, the authentication information may be input to the copying machine 1001 in any configuration. For example, in the case where the authentication information is added to the PDL print job received from the client computer 1005, the print job, which is associated with the authentication information of the authenticated user and stored, may be printed in sync with printing. In the case where the user of the copying machine 1001 performs user authentication before using the copying machine, the stored print job may be printed using the authentication information.

Further, an expiration period may be set to the stored print job, and the stored job may be automatically deleted in the case where the expiration period elapses.

As a result, only the print-instructing person of the print job can resume the stored print job.

Fifth Example

Still another example of the present invention implemented by the copying machine 1001 having the above-mentioned configuration as an image forming device will be described.

Figure 9:
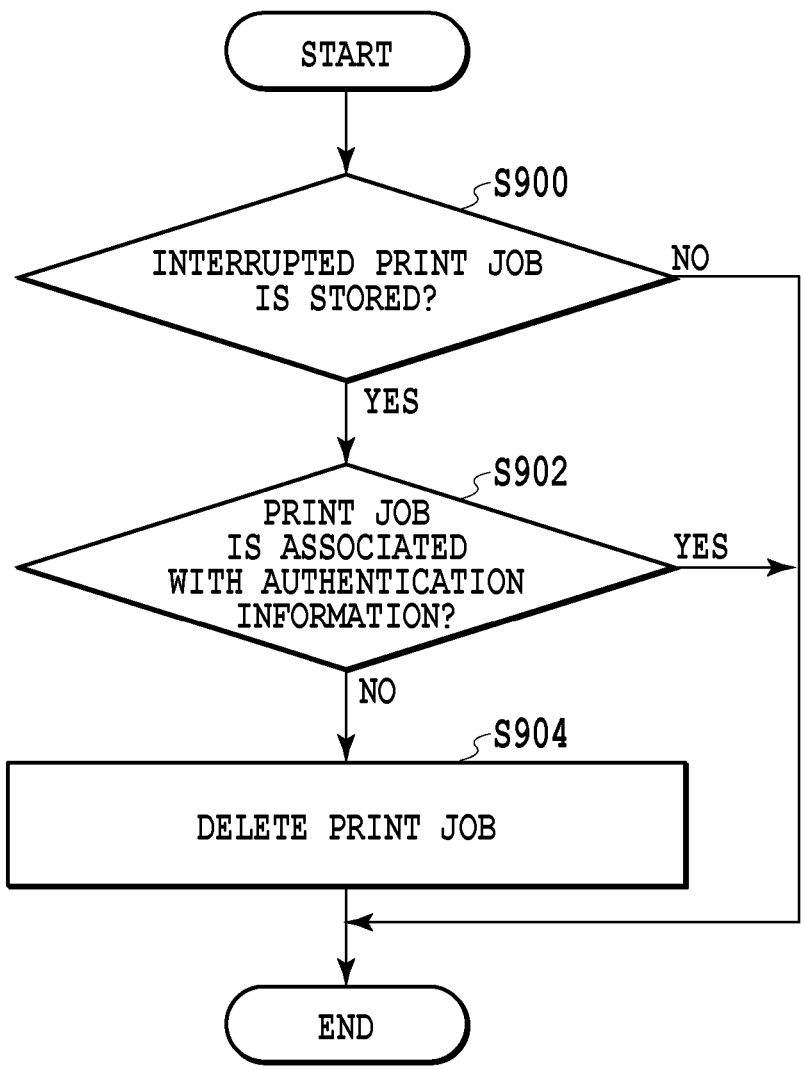

FIG. 9 is a flow chart at power-on. The flow chart in FIG. 9 is executed by the CPU 2001 in FIG. 2 according to the program stored in the HDD 2004 in FIG. 2. In the present example, a state is assumed in which immediate power-off is requested at power-off, and power is turned on after all print jobs are stored in the nonvolatile storage area.

In S900, in the case of receiving a power-on request, the CPU 2001 determines whether or not printing is interrupted at power-off, and a print job is stored in the nonvolatile storage area. In the case where there is the stored print job, processing proceeds to S902, and in the other case, processing is finished.

In S902, the CPU 2001 determines whether or not the authentication information is associated with the print job stored in the nonvolatile storage area (third determination). In the case where the authentication information is associated with the print job, processing is finished, and in the other case, processing proceeds to S904.

In S904, the CPU 2001 deletes the appropriate print job from the nonvolatile storage area.

As a result, even in the case where the print job is stored without being associated with the authentication information at power-off, by deleting the print job at activation, only the print-instructing person of the stored print job can resume printing. That is, according to the prior art, whether or not stored print data is printed is inquired to the print-requesting device at power-on, and in the case where no response is made from the print-requesting device, the print data is deleted. The present example can solve this problem.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-026466, filed Feb. 9, 2012, which is hereby incorporated by reference herein in its entirety.

What is claimed is:

1. An image forming device comprising:
    a first determining unit configured to determine, after receiving a power-off request, whether or not print processing is being executed;
    a second determining unit configured to determine, in a case where the first determining unit determines that print processing is being executed, whether or not authentication information of a print-instructing person of the print processing being executed is identifiable;
    a cut-off unit configured to associate a print job of the print processing being executed with the authentication information and store the print job and the authentication information in a nonvolatile storage area in a case where the second determining unit determines that the authentication information is identifiable, and then cut-off power;
    a third determining unit configured to determine, after receiving a power-on request, whether or not a print job stored in the nonvolatile storage area is associated with the authentication information; and a deletion unit configured to delete, in a case where the stored print job is not associated with the authentication information, the unassociated print job stored in the nonvolatile storage area.

2. An image forming method performed by an image forming device, comprising:

a first determining step of determining, after receiving a power-off request, whether or not print processing is being executed;

a second determining step of determining, in a case where it is determined in the first determining step that print processing is being executed, whether or not authentication information of a print-instructing person of the print processing being executed is identifiable;

a cut-off step of associating a print job of the print processing being executed with the authentication information and storing the print job associated with the authentication information in a nonvolatile storage area in a case where it is determined in the second determining step that the authentication information is identifiable, and then cut-off power;

a third determining step of determining, after receiving a power-on request, whether or not a print job stored in the nonvolatile storage area is associated with the authentication information; and a deletion step of deleting, in a case where the stored print job is not associated with the authentication information, the unassociated print job stored in the nonvolatile storage area.

3. A non-transitory computer readable storage medium on which is recorded code of a program for causing a computer to perform the method according to claim 2.

\* \* \* \* \*